US011260482B2

(12) United States Patent
Fukazawa

(10) Patent No.: US 11,260,482 B2
(45) Date of Patent: Mar. 1, 2022

(54) FLEXIBLE RING FITTING DEVICE

(71) Applicant: HONDA MOTOR CO., LTD., Tokyo (JP)

(72) Inventor: Kinya Fukazawa, Tochigi (JP)

(73) Assignee: HONDA MOTOR CO., LTD., Tokyo (JP)

( * ) Notice: Subject to any disclaimer, the term of this patent is extended or adjusted under 35 U.S.C. 154(b) by 375 days.

(21) Appl. No.: 16/269,889

(22) Filed: Feb. 7, 2019

(65) Prior Publication Data
US 2019/0247965 A1 Aug. 15, 2019

(30) Foreign Application Priority Data

Feb. 13, 2018 (JP) .............................. JP2018-023515

(51) Int. Cl.
*B23P 19/08* (2006.01)
(52) U.S. Cl.
CPC ......... *B23P 19/084* (2013.01); *B23P 2700/50* (2013.01)
(58) Field of Classification Search
CPC ...... B23P 19/084; B23P 2700/50; B23P 19/02
See application file for complete search history.

(56) References Cited

U.S. PATENT DOCUMENTS

| 2,837,812 | A | * | 6/1958 | Erdmann | ............... | B23P 19/084 |
| | | | | | | 29/809 |
| 3,315,746 | A | * | 4/1967 | Wagner | ..................... | G09F 7/10 |
| | | | | | | 116/324 |
| 3,851,369 | A | * | 12/1974 | Eschholz | ............... | B23P 19/084 |
| | | | | | | 29/717 |
| 5,062,194 | A | * | 11/1991 | Mercurio | ............... | B23P 19/084 |
| | | | | | | 29/451 |
| 5,083,354 | A | * | 1/1992 | Leopoldo | ............... | B23P 19/084 |
| | | | | | | 29/235 |
| 6,421,897 | B1 | * | 7/2002 | Amaral | .................. | B23P 19/084 |
| | | | | | | 29/235 |
| 2004/0040138 | A1 | * | 3/2004 | Thal | ........................ | B25B 27/20 |
| | | | | | | 29/428 |
| 2018/0339379 | A1 | * | 11/2018 | Noda | .................. | B25B 27/0028 |

FOREIGN PATENT DOCUMENTS

| DE | 3533674 A1 | * | 3/1987 | ......... | B25B 27/0028 |
| EP | 1806205 A1 | * | 7/2007 | ............ | B23P 19/084 |
| JP | S59-142077 A | | 8/1984 | | |
| JP | H02-011384 | | 1/1990 | | |

(Continued)

OTHER PUBLICATIONS

Japanese Office Action dated Jul. 9, 2019, 2 pages.

*Primary Examiner* — Joel D Crandall
(74) *Attorney, Agent, or Firm* — Rankin, Hill & Clark LLP

(57) ABSTRACT

The flexible ring fitting device includes a flexible ring disposition mechanism 10 for disposing a flexible ring R relative to an annular groove G of a workpiece W and flexible ring assembly mechanisms 421 and 422 including an arm portion 424 rotating while pushing the flexible ring R along the outer periphery of the workpiece W. The flexible ring assembly mechanisms 421 and 422 are movable with respect to the workpiece W and include an elastic body 51 urging the arm portion 424 of the flexible ring assembly mechanisms 421 and 422 so as to press the arm portion 424 with respect to the workpiece W.

4 Claims, 8 Drawing Sheets

(56) References Cited

FOREIGN PATENT DOCUMENTS

| | | | |
|---|---|---|---|
| JP | H06-254732 A | 9/1994 | |
| JP | 09323226 A * | 12/1997 | |
| JP | 11114731 A * | 4/1999 | ............ B23P 19/084 |
| JP | H11-114731 | 4/1999 | |
| JP | 2000-225579 A | 8/2000 | |

* cited by examiner

FLEXIBLE RING FITTING DEVICE

This application is based on and claims the benefit of priority from Japanese Patent Application No. 2018-023515, filed on 13 Feb. 2018, the content of which is incorporated herein by reference.

BACKGROUND OF THE INVENTION

Field of the Invention

The present invention relates to a flexible ring fitting device.

Related Art

Known in the related art are devices fitting a flexible O-ring into a groove of a columnar workpiece that has an outer peripheral surface where the groove (annular groove) is formed (see, for example, Patent Documents 1 and 2). In the devices, a rod-shaped member rotating along the outer peripheral surface of the workpiece is rotated while the O-ring is pressed against the workpiece. The O-ring is fitted into the groove of the workpiece as a result.

Patent Document 1: Japanese Examined Patent Application Publication No. H02-11384

Patent Document 2: Japanese Unexamined Patent Application, Publication No. H11-114731

SUMMARY OF THE INVENTION

In the devices according to the related art that are described in Patent Documents 1 and 2, the rod-shaped member (arm portion) rotates about the axial center of the workpiece having a predetermined diameter. Accordingly, no O-ring can be fitted into a groove of a workpiece having a diameter different from the predetermined diameter. In other words, the devices according to the related art are configured to be capable of fitting O-rings simply with respect to workpieces having one type of diameter.

Besides, even in a case where O-rings are fitted with respect to the workpieces having one type of diameter by means of the devices according to the related art, it is not easy to fit the O-ring into the workpiece groove without a positional relationship in which the axial center of rotation of the arm portion and the axial center of the workpiece coincide with each other.

An object of the present invention is to provide a flexible ring fitting device capable of fitting a flexible ring in response to workpieces having different diameters and capable of fitting the flexible ring even in the event of a positional relationship in which the axial center of rotation of an arm portion and the axial center of a workpiece are misaligned from each other.

In order to achieve the above object, the present invention provides a flexible ring fitting device (such as a flexible ring fitting device 1 to be described later) fitting a flexible ring (such as an O-ring R to be described later) into an annular groove (such as a groove G to be described later) of a workpiece (such as a workpiece W to be described later) having the annular groove in an outer periphery of the workpiece. The flexible ring fitting device includes a flexible ring disposition mechanism (such as an O-ring supply rail 10 and an O-ring temporary placement table 47 to be described later) for disposing the flexible ring relative to the annular groove of the workpiece and a flexible ring assembly mechanism (such as a rotating portion main body 421, a diameter direction moving portion 422, and an arm portion 424 to be described later) including an arm portion rotating while pushing the flexible ring along the outer periphery of the workpiece. The flexible ring assembly mechanism is movable with respect to the workpiece and the flexible ring assembly mechanism includes an elastic body (such as a spring 51 to be described later) urging the arm portion of the flexible ring assembly mechanism so as to press the arm portion with respect to the workpiece.

According to the present invention, the flexible ring assembly mechanism moves and performs pressing so as to perform pressing with respect to the workpiece against the urging force of the elastic body. As a result, even in a case where the diameter of the workpiece is large or small or even in a case where the center of the workpiece is misaligned from the axial center of rotation of the arm portion, it is possible, by means of the expansion and contraction of the elastic body, for the arm portion to fit the flexible ring into the annular groove of the workpiece with an appropriate pressing force after a movement to an appropriate position following the peripheral surface of the flexible ring positioned on the outer peripheral surface of the workpiece and subsequently fitted into the annular groove of the workpiece W. In other words, the flexible ring fitting device is capable of fitting the flexible ring into the annular groove of the workpiece by flexibly responding to workpieces having various diameters.

A surface of the arm portion of the flexible ring assembly mechanism in contact with the flexible ring is inclined toward a tip. Accordingly, it is possible to press the flexible ring on the inclined surface in fitting the flexible ring into the annular groove of the workpiece by pressing the flexible ring with the arm portion. Accordingly, an excessive pressing force can be prevented from acting on the flexible ring from the arm portion either in a case where the diameter of the workpiece is large or in a case where the diameter of the workpiece is small. When the arm portion rotates, the flexible ring abuts against the inclined surface. Accordingly, the flexible ring can be smoothly guided to the annular groove of the workpiece. In a case where the flexible ring fitting device is further reduced in size, it is possible to narrow the movement range of the arm portion moved by the elastic body.

The flexible ring fitting device includes a pressing mechanism including a flexible ring holding mechanism (such as an O-ring holding shaft 426 to be described later) for fitting a part of the flexible ring into the annular groove of the workpiece. The pressing mechanism moves along with the flexible ring assembly mechanism. Accordingly, it is possible for the arm portion to push the other part of the flexible ring into the annular groove of the workpiece with the flexible ring partially fitted in the annular groove of the workpiece, and thus the other part of the flexible ring can be reliably fitted into the annular groove of the workpiece by the arm portion.

According to the present invention, it is possible to provide a flexible ring fitting device capable of fitting a flexible ring in response to workpieces having different diameters and capable of fitting the flexible ring even in the event of a positional relationship in which the axial center of rotation of an arm portion and the axial center of a workpiece are misaligned from each other.

DETAILED DESCRIPTION OF THE INVENTION

Figure 1:
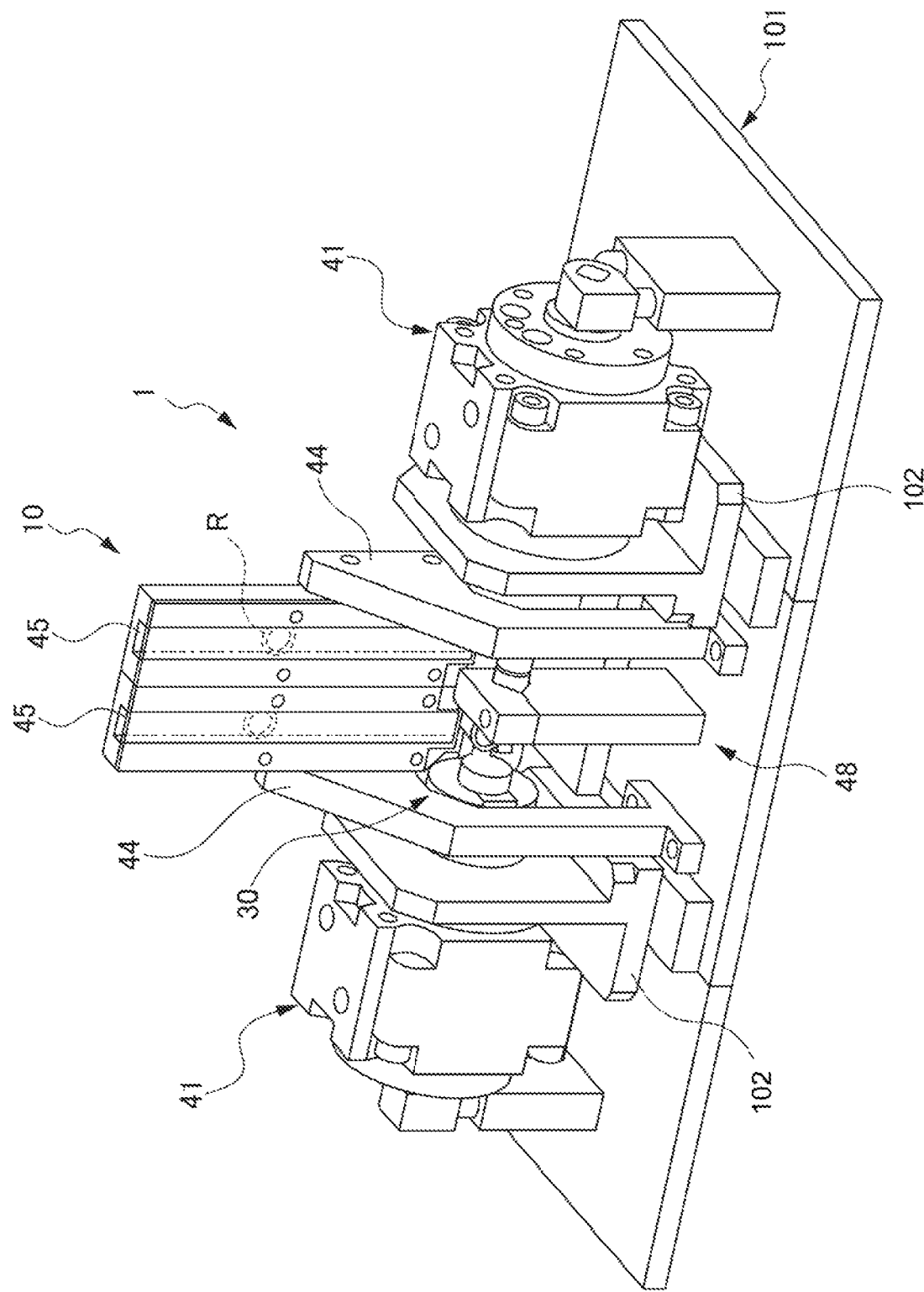
FIG. 1 is a perspective view illustrating a flexible ring fitting device according to an embodiment of the present invention.

An embodiment of the present invention will be described in detail with reference to accompanying drawings. A flexible ring fitting device 1 is used so that a rubber-based O-ring R, which is a flexible ring, is fitted into a groove G (annular groove G). The groove G extends in the circumferential direction of a workpiece W and goes around. Each groove G is formed in the outer peripheral surface of a longitudinal end portion of the workpiece W. The workpiece W, which has a cylindrical shape, is a pipe member (pipe) interconnecting cases such as a crankcase and a differential case in a vehicle. FIG. 1 is a perspective view illustrating the flexible ring fitting device 1.

In the following description, the direction in which the rotary shafts of a pair of rotary cylinders 41 (described later) extend (substantially leftward-rightward direction in FIG. 1 in which the rotary cylinder 41 on the left side and the rotary cylinder 41 on the right side are interconnected in FIG. 1) is defined as a leftward-rightward direction. In addition, the direction from an O-ring supply rail 10 (described later) toward a workpiece holding unit 48 (left oblique forward downward direction in FIG. 1) is defined as a forward direction and the direction that is opposite to the forward direction (right oblique rearward upward direction in FIG. 1) is defined as a rearward direction. In addition, the direction from a base plate 101 toward the O-ring supply rail 10 (upward direction in FIG. 1) is defined as an upward direction and the direction that is opposite to the upward direction (downward direction in FIG. 1) is defined as a downward direction. The flexible ring fitting device 1 has a symmetrical configuration. Accordingly, the following description will focus on the right side and description of the left side will be omitted.

As illustrated in FIG. 1, the flexible ring fitting device 1 is provided with the O-ring supply rail 10, a flexible ring assembly portion 30, and a spring 51 (see FIG. 3), which are disposed on the rectangular flat plate-shaped base plate 101.

Specifically, the pair of rotary cylinders 41 facing each other in the leftward-rightward direction is disposed on the base plate 101. Each of the rotary cylinders 41 is supported by a cylinder support member 102 so as to be movable in the forward-rearward direction with respect to the base plate 101.

The O-ring supply rail 10 is disposed between the pair of rotary cylinders 41. The O-ring supply rail 10 has a rectangular plate shape. Both ends of the O-ring supply rail 10 in the leftward-rightward direction are respectively fixed to a pair of support plates 44 and are supported with a positional relationship in which the longitudinal direction of the O-ring supply rail 10 coincides with the upward-downward direction. In this configuration, a pair of O-ring transport spaces 45 extending in the longitudinal direction of the O-ring supply rail 10 is formed in the O-ring supply rail 10. In the O-ring transport space 45, the O-ring R is transported from the upper end portion of the O-ring supply rail 10 to the lower end portion of the O-ring supply rail 10.

Figure 2:
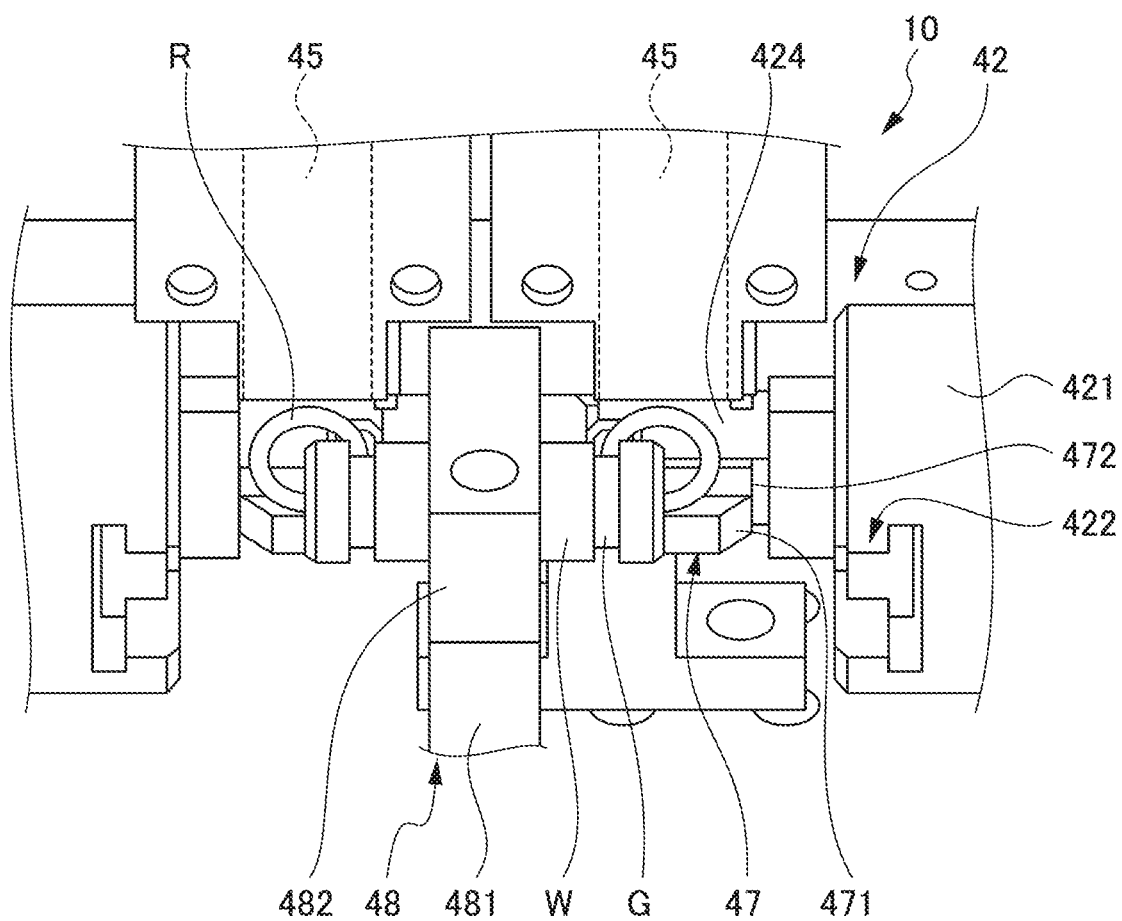
FIG. 2 is an enlarged perspective view illustrating the flexible ring fitting device according to an embodiment of the present invention.

As illustrated in FIG. 2, an O-ring temporary placement table 47 is provided on the lower side of the lower end portion of the O-ring supply rail 10. FIG. 2 is an enlarged perspective view illustrating the workpiece holding unit 48 of the flexible ring fitting device 1.

The O-ring temporary placement table 47 has a horizontal plate-shaped portion 471 having a horizontal upper surface and a back wall portion 472 rising in the upward direction from the rear portion of the horizontal plate-shaped portion 471. In this configuration, the O-ring R that has fallen in the downward direction from the lower end portion of the O-ring supply rail 10 abuts against the upper surface of the horizontal plate-shaped portion 471 and is prevented from falling in the downward direction. At that position, the O-ring R abuts against the upper surface of the horizontal plate-shaped portion 471 and the back wall portion 472. As a result, the O-ring R is supported by the upper surface of the horizontal plate-shaped portion 471 and the back wall portion 472 with a positional relationship in which the axial center of the O-ring R is oriented substantially in the forward-rearward direction as illustrated in FIG. 2. The O-ring R that is supported as described above is disposed relative to the groove G of the workpiece W. More specifically, the O-ring R is disposed so as to directly face the groove G. It should be noted that the O-ring R may not directly face the groove G of the workpiece W insofar as the O-ring R is relative to the groove G.

The workpiece holding unit 48 is provided on the front side of the lower end portion of the O-ring supply rail 10. The workpiece holding unit 48 is provided with a lower side support portion 481 and an upper side support portion 482. A lower side recessed portion 483 (see FIG. 5) recessed downwards in a V shape is formed in the upper surface of the lower side support portion 481. An upper side recessed portion (not illustrated) recessed upwards in a V shape is formed in the lower surface of the upper side support portion 482. By the upper surface of the lower side support portion 481 approaching and being disposed in proximity to the lower surface of the upper side support portion 482, a through hole is formed by the lower side recessed portion 483 and the upper side recessed portion (not illustrated). As illustrated in FIG. 2, in this through hole, the columnar workpiece W is held so as to be immovable with respect to the base plate 101 with the workpiece W sandwiched by the lower side support portion 481 and the upper side support portion 482.

Figure 3:
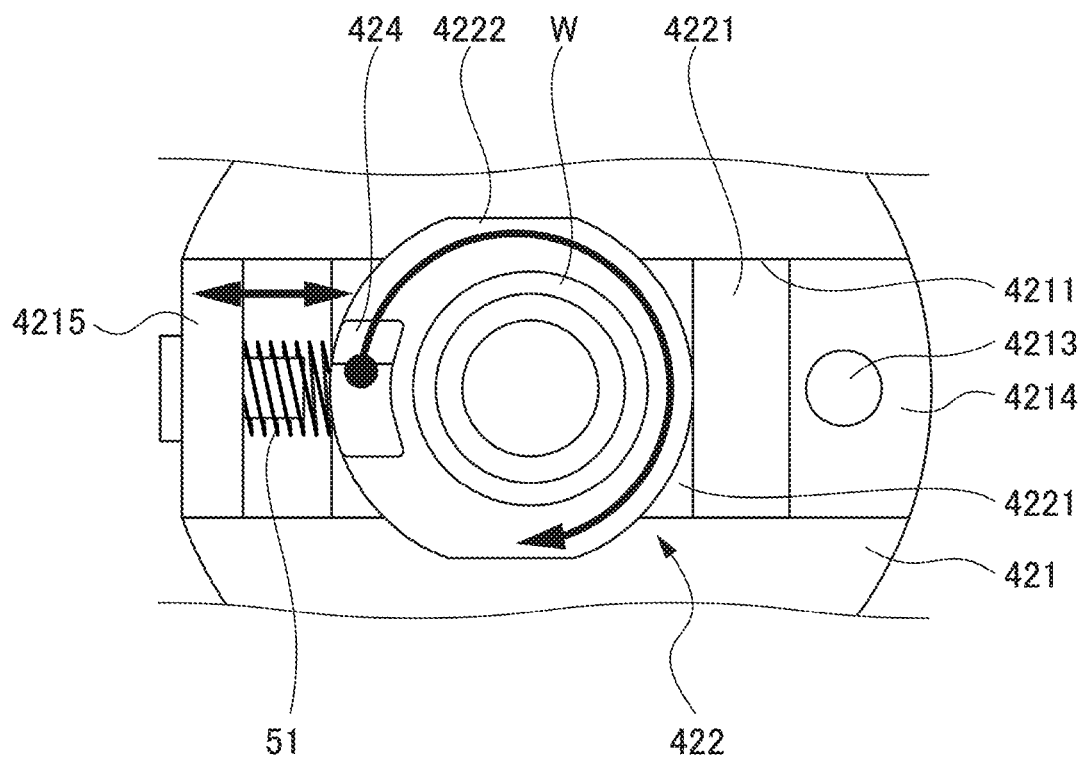
FIG. 3 is an enlarged perspective view illustrating the configuration of a spring of the flexible ring fitting device and the vicinity of the spring according to an embodiment of the present invention.

The flexible ring assembly portion 30 and the spring 51 are provided in the rotating portion 42 of the rotary cylinder 41. Specifically, the rotating portion 42 is provided with a rotating portion main body 421 as illustrated in the drawings including FIGS. 2 and 3. The flexible ring assembly portion 30 has a diameter direction moving portion 422 and an arm portion 424. FIG. 3 is an enlarged perspective view illustrating the configuration of the spring 51 of the flexible ring fitting device 1 and the vicinity of the spring 51.

The rotating portion main body 421 has a columnar outer shape and is connected, so as to be integrally rotatable, to the rotary shaft (not illustrated) of the rotary cylinder 41 with a positional relationship in which the rotating portion main body 421 is coaxial with the rotary shaft (not illustrated) of the rotary cylinder 41. A guide groove 4211 extending in the diameter direction of the rotating portion main body 421 is formed at the diameter position of the rotating portion main body 421. The diameter direction moving portion 422 is disposed in the guide groove 4211 so as to be movable in the diameter direction of the rotating portion main body 421 in the guide groove 4211.

The diameter direction moving portion 422 has a moving portion base portion 4221 fitted in the guide groove 4211 and sliding with respect to the rotating portion main body 421 in the guide groove 4211, a substantially elliptical base portion protruding portion 4222 protruding from the moving portion base portion 4221, and the arm portion 424 further protruding from a longitudinal end portion of the protruding end surface of the base portion protruding portion 4222.

The moving portion base portion 4221 has a rectangular shape. One end portion of the moving portion base portion 4221 is capable of abutting against a retainer 4214 fixed by a pin 4213 to one end portion of the guide groove 4211 by the moving portion base portion 4221 moving in the guide groove 4211. The other end portion of the moving portion base portion 4221 abuts against one end portion of the spring 51 as an elastic body constituted by a compression spring. The other end portion of the spring 51 abuts against a spring abutting portion 4215 fixed to the rotating portion main body 421 in the other end portion of the guide groove 4211. As a result, the spring 51 urges the diameter direction moving portion 422 in the direction toward the retainer 4214, that is, the direction in which the arm portion 424 is pressed with respect to the workpiece W held by the workpiece holding unit 48.

The base portion protruding portion 4222 is molded integrally with and provided in the longitudinal middle portion of the moving portion base portion 4221. The arm portion 424 is molded integrally with and provided in the base portion protruding portion 4222. As illustrated in the drawings including FIG. 4, a rectangular notch 4241 is formed at a part of the tip portion of the arm portion 424. An O-ring holding shaft 426 passes through the rectangular notch 4241 when a part of the O-ring R is fitted into the groove G of the workpiece W, which will be described later.

Figure 4:
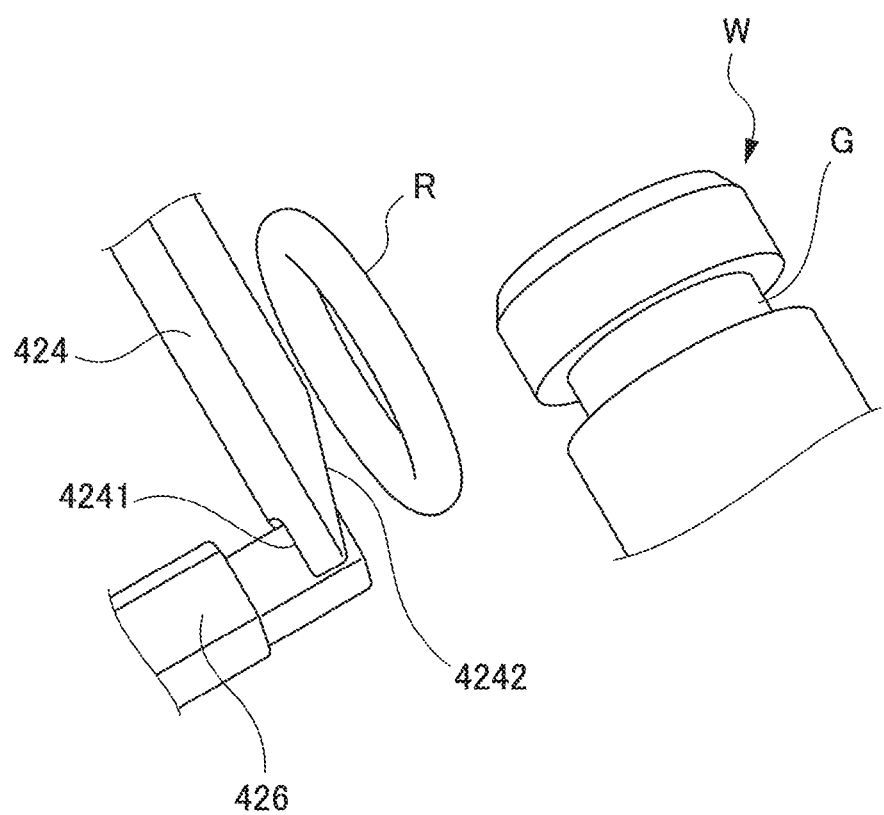
FIG. 4 is an enlarged upper perspective view illustrating a state where an O-ring and the like are away from a workpiece in the flexible ring fitting device according to an embodiment of the present invention.

As illustrated in the drawings including FIG. 4, the part of the tip portion of the arm portion 424 that lacks the notch 4241 and abuts against the O-ring R as will be described later has an inclined surface 4242 inclined so as to become tapered toward the tip that is an extending end. By the rotary cylinder 41 being driven in this configuration, the arm portion 424 rotates while pushing the O-ring R along the outer periphery of the workpiece W with the inclined surface 4242 abutting against the O-ring R. As a result, the O-ring R is fitted into the groove G of the workpiece W. FIG. 4 is an enlarged upper perspective view illustrating a state where the O-ring R and the like are away from the workpiece # in the flexible ring fitting device 1.

The O-ring holding shaft 426 is provided on the rear side of the workpiece holding unit 48. The O-ring holding shaft 426 is configured such that the O-ring holding shaft 426 can be driven by a spring (not illustrated), a cylinder (not illustrated), or the like and moved integrally with the rotary cylinder 41 in the forward-rearward direction with a positional relationship in which the longitudinal direction of the O-ring holding shaft 426 is oriented in the forward-rearward direction. The O-ring holding shaft 426 moves in the forward direction and fits a part of the O-ring R into the groove G of the workpiece W.

Figure 5:
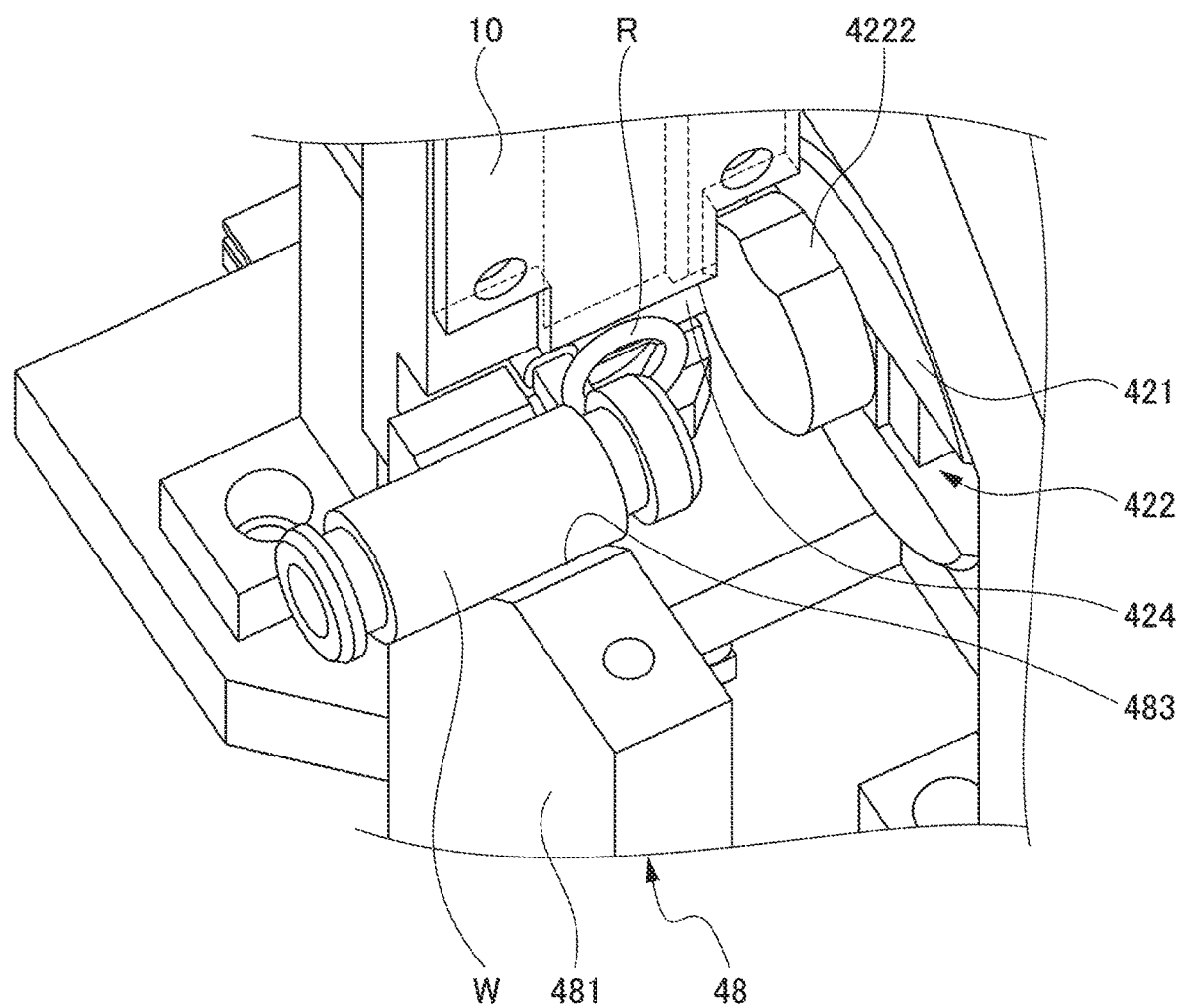
FIG. 5 is an enlarged front perspective view illustrating a state where the O-ring is pressed against the workpiece in the flexible ring fitting device according to an embodiment of the present invention.
Figure 6:
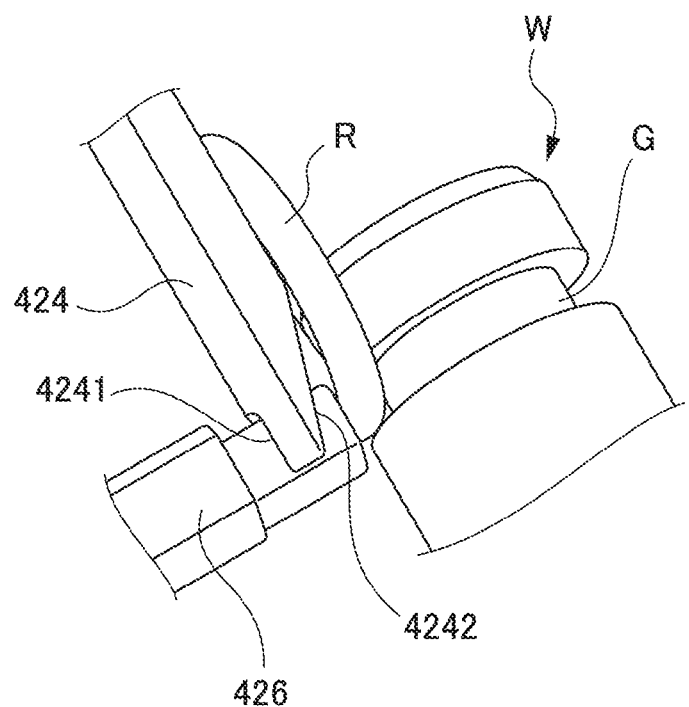
FIG. 6 is an enlarged upper perspective view illustrating the state where the O-ring is pressed against the workpiece in the flexible ring fitting device according to an embodiment of the present invention.
Figure 7:
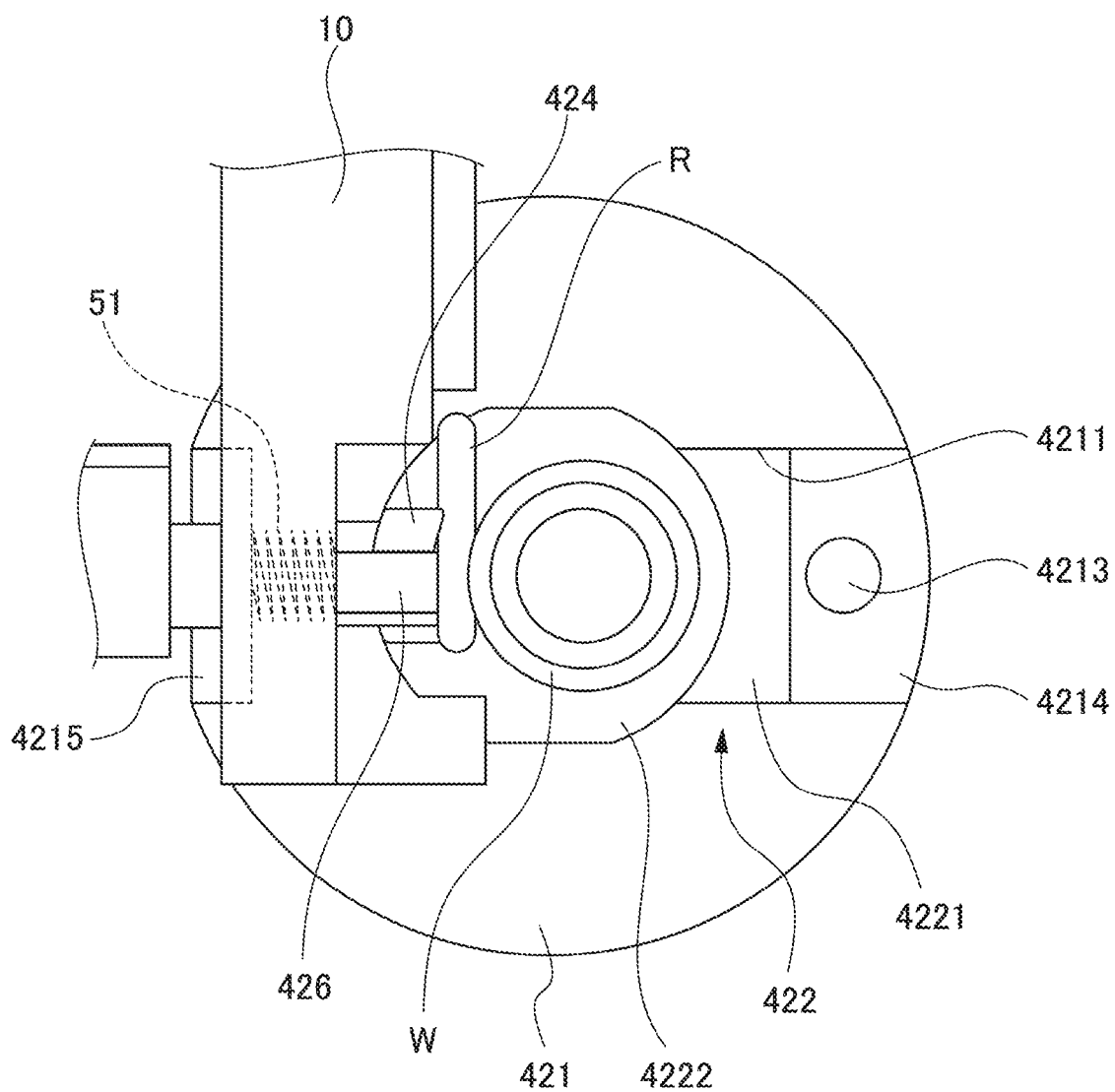
FIG. 7 is an enlarged lateral perspective view illustrating the state where the O-ring is pressed against the workpiece in the flexible ring fitting device according to an embodiment of the present invention.

Next, an operation for fitting the O-ring R into the groove G of the workpiece W with the flexible ring fitting device 1 configured as described above will be described. First, the O-ring R falls from the lower end portion of the O-ring supply rail 10 and is supported by the O-ring temporary placement table 47. Next, the rotary cylinder 41 moves in the forward direction with respect to the base plate 101 and the O-ring R is moved in the forward direction by the arm portion 424. Then, the O-ring R has a positional relationship in which the O-ring R is pinched by the arm portion 424 and the workpiece W as illustrated in FIGS. 5 to 7. FIG. 5 is an enlarged front perspective view illustrating a state where the O-ring R is pressed against the workpiece in the flexible ring fitting device 1. FIG. 6 is an enlarged upper perspective view illustrating the state where the O-ring R is pressed against the workpiece W in the flexible ring fitting device 1. FIG. 7 is an enlarged lateral perspective view illustrating the state where the O-ring R is pressed against the workpiece W in the flexible ring fitting device 1.

At this time, the forward movement of the rotary cylinder 41 terminates and stops. Simultaneously with the movement of the arm portion 424 and the rotary cylinder 41, the O-ring holding shaft 426 moves in the forward direction and abuts against a part of the O-ring R. Then, the O-ring R is partially fitted into the groove G. Then, the O-ring holding shaft 426 continues to press the O-ring R fitted in the groove G with respect to the workpiece W and the O-ring R is held in this state. In this manner, the O-ring holding shaft 426 moves simultaneously with the arm portion 424 and the rotary cylinder 41, and thus it is possible to achieve cycle time improvement in fitting the O-ring R into the groove G of the workpiece W.

Figure 8:
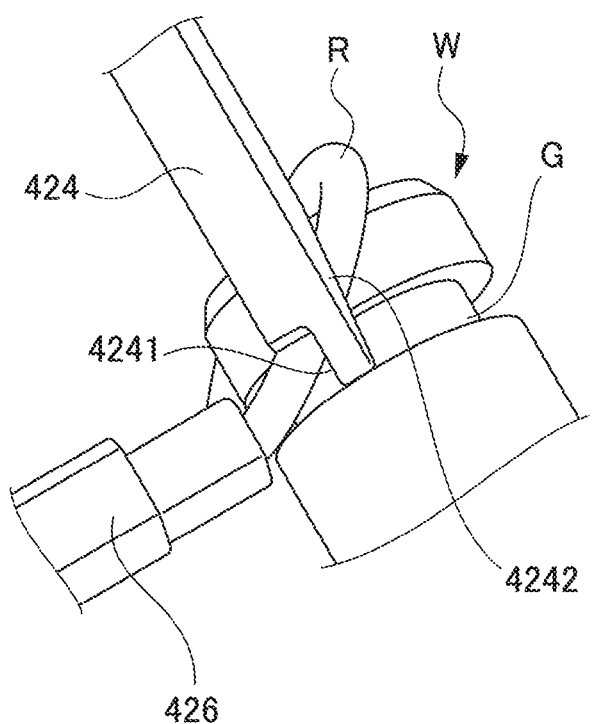
FIG. 8 is an enlarged lateral perspective view illustrating a state where the O-ring is fitted in the groove of the workpiece as a result of arm portion rotation in the flexible ring fitting device according to an embodiment of the present invention.

Next, the rotary cylinder 41 is driven and the arm portion 424 rotates by 270 degrees about the rotary shaft of the rotating portion main body 421. As illustrated in FIG. 8, at this time, the O-ring R and the workpiece W are pressed by the arm portion 424 in the direction toward the axial center of rotation of the arm portion 424. FIG. 8 is an enlarged lateral perspective view illustrating a state where the O-ring R is fitted in the groove G of the workpiece W as a result of rotation of the arm portion 424 in the flexible ring fitting device 1.

In a case where the diameter of the workpiece W is large or small and the center of the workpiece W is misaligned from the axial center of rotation of the arm portion 424, the diameter direction moving portion 422 moves along the guide groove 4211 against the urging force of the spring 51 such that the arm portion 424 is moved by the reaction force of the pressing to a position following the outer peripheral surface of the workpiece W, more specifically, a position following the peripheral surface of the O-ring R positioned on the outer peripheral surface of the workpiece W and subsequently fitted into the groove G of the workpiece W. As a result, the O-ring R is pressed and fitted by the arm portion 424 with no extremely strong pressing force acting on the O-ring R as illustrated in FIG. 8.

The present embodiment has the following effects. In the present embodiment, the flexible ring fitting device 1 fitting an O-ring as a flexible ring into the annular groove G of the workpiece W having the annular groove G in the outer periphery of the workpiece W is provided with a flexible ring disposition mechanism for disposing the O-ring relative to the annular groove G of the workpiece W and the rotating portion main body 421, the diameter direction moving portion 422, and the arm portion 424 as a flexible ring assembly mechanism having the arm portion 424 rotating while pushing the O-ring along the outer periphery of the workpiece W. The flexible ring assembly mechanism is provided with an elastic body that urges the arm portion 424 of the flexible ring assembly mechanism so as to press the arm portion 424 with respect to the workpiece W and is movable with respect to the workpiece W.

As a result, the diameter direction moving portion 422 moves along the guide groove 4211 against the urging force of the spring 51. As a result, even in a case where the diameter of the workpiece W is large or small or even in a case where the center of the workpiece W is misaligned from the axial center of rotation of the arm portion 424, it is possible, by means of the expansion and contraction of the spring 51, for the arm portion 424 to fit the O-ring R into the groove G of the workpiece W with an appropriate pressing force after a movement to an appropriate position following the peripheral surface of the O-ring R positioned on the outer peripheral surface of the workpiece W and subsequently fitted into the groove G of the workpiece W. In other words, the flexible ring fitting device 1 is capable of fitting the O-ring R into the groove G of the workpiece W by flexibly responding to the workpieces W having various diameters.

The surface of the arm portion 424 of the flexible ring assembly mechanism that is in contact with the flexible O-ring R has the inclined surface 4242 inclined toward the tip. As a result, it is possible to press the O-ring R on the inclined surface 4242 in fitting the O-ring R into the groove G of the workpiece W by pressing the O-ring R with the arm portion 424. Accordingly, an excessive pressing force acts on the O-ring R from the arm portion 424 neither in a case where the diameter of the workpiece W is large nor in a case where the diameter of the workpiece W is small and it is possible to push and drift the O-ring R toward the groove G. When the arm portion 424 rotates, the O-ring R abuts against the inclined surface 4242. Accordingly, the O-ring R can be smoothly guided to the groove G of the workpiece W. In a case where the flexible ring fitting device 1 is further reduced in size, it is possible to narrow the movement range of the diameter direction moving portion 422 moved by the spring 51.

Also provided is a pressing mechanism having the O-ring holding shaft 426 as a flexible ring holding mechanism for fitting a part of the O-ring into the groove G of the workpiece W. The O-ring holding shaft 426 of the pressing mechanism moves along with, for example, the arm portion 424 as the flexible ring assembly mechanism. As a result, it is possible for the arm portion 424 to push the other part of the O-ring R into the groove G of the workpiece W with the O-ring R partially fitted in the groove G of the workpiece W, and thus the other part of the O-ring R can be reliably fitted into the groove G of the workpiece W by the arm portion 424.

The present invention is not limited to the above-described embodiment. Modifications, improvements, and the like within the scope of achieving the object of the present invention are included in the present invention. For example, the configuration of each part of the flexible ring fitting device is not limited to the configuration of each part of the flexible ring fitting device 1 according to the present embodiment. In other words, each configuration such as the flexible ring disposition mechanism, the flexible ring assembly mechanism, the elastic body, the inclined surface, the flexible ring holding mechanism, and the pressing mechanism is not limited to each configuration such as the O-ring supply rail 10, the O-ring temporary placement table 47, the rotating portion main body 421, the diameter direction moving portion 422, the arm portion 424, the spring 51, the inclined surface 4242, and the O-ring holding shaft 426 according to the present embodiment. Accordingly, the flexible ring fitting device may lack the O-ring holding shaft 426 insofar as, for example, the O-ring R can be held. Although the moving portion base portion 4221 is retained by the retainer 4214 fixed by the pin 4213 in the present embodiment, the present invention is not limited to this configuration. For example, the pin 4213 may retain the moving portion base portion 4221 without the retainer 4214 being provided.

EXPLANATION OF REFERENCE NUMERALS

1 FLEXIBLE RING FITTING DEVICE
10 O-RING SUPPLY RAIL
47 O-RING TEMPORARY PLACEMENT TABLE
51 SPRING
421 ROTATING PORTION MAIN BODY
422 DIAMETER DIRECTION MOVING PORTION
424 ARM PORTION
426 O-RING HOLDING SHAFT
G GROOVE
R O-RING
W WORKPIECE

What is claimed is:
1. A flexible ring fitting device fitting a flexible ring into an annular groove of a workpiece having the annular groove in an outer periphery of the workpiece, the flexible ring fitting device comprising:
a flexible ring disposition mechanism including a flexible ring supply rail and a flexible ring placement table, the flexible ring supply rail configured to supply the flexible ring to the flexible ring placement table, and the flexible ring placement table disposed to dispose the flexible ring relative to the annular groove of the workpiece; and
a flexible ring assembly mechanism including an arm portion, a rotating portion main body, and a diameter direction moving portion, wherein the rotating portion main body rotates the arm portion so that the arm portion rotates while pushing the flexible ring along the outer periphery of the workpiece, and the diameter direction moving portion making the arm portion movable in a diameter direction of the rotating portion main body that rotates the arm portion,
wherein
the flexible ring assembly mechanism is movable with respect to the workpiece, and
the flexible ring assembly mechanism further includes an elastic body urging the arm portion of the flexible ring assembly mechanism so as to press the arm portion inward in a radial direction of the rotating portion main body.

2. The flexible ring fitting device according to claim 1, wherein a surface of the arm portion of the flexible ring assembly mechanism in contact with the flexible ring is inclined toward a tip.

3. The flexible ring fitting device according to claim 1, further comprising a pressing mechanism including a flexible ring holding shaft configured to fit a part of the flexible ring into the annular groove of the workpiece,
   wherein the pressing mechanism moves along with the flexible ring assembly mechanism.

4. The flexible ring fitting device according to claim 1, wherein the elastic body is a compression spring.

\* \* \* \* \*